(12) United States Patent
Loxton et al.

(10) Patent No.: US 10,526,119 B2
(45) Date of Patent: Jan. 7, 2020

(54) PROTECTIVE BUFFER STRAP

(71) Applicant: Earle John Loxton, Somerset West (ZA)

(72) Inventors: Earle John Loxton, Somerset West (ZA); Johan Bredenkamp, Cape Town (ZA)

(73) Assignee: Earle John Loxton, Somerset West (ZA)

( * ) Notice: Subject to any disclaimer, the term of this patent is extended or adjusted under 35 U.S.C. 154(b) by 13 days.

(21) Appl. No.: 15/756,239

(22) PCT Filed: Aug. 30, 2016

(86) PCT No.: PCT/ZA2016/050031
§ 371 (c)(1),
(2) Date: Feb. 28, 2018

(87) PCT Pub. No.: WO2017/044995
PCT Pub. Date: Mar. 16, 2017

(65) Prior Publication Data
US 2018/0273264 A1 Sep. 27, 2018

(30) Foreign Application Priority Data
Sep. 8, 2015 (ZA) .................................. 2015/06635

(51) Int. Cl.
B65D 63/10 (2006.01)
B62J 23/00 (2006.01)
(Continued)

(52) U.S. Cl.
CPC .............. B65D 63/10 (2013.01); B62J 23/00 (2013.01); F16B 1/00 (2013.01); F16B 2/08 (2013.01);
(Continued)

(58) Field of Classification Search
CPC .... B65D 63/10; B65D 63/16; B65D 2313/02; B62J 23/00; B62J 99/00; F16B 7/0433;
(Continued)

(56) References Cited

U.S. PATENT DOCUMENTS 3,964,653 A 6/1976 Strutz
4,045,843 A 9/1977 Loose
(Continued)

FOREIGN PATENT DOCUMENTS

CN 102275547 12/2011
EP 0619103 10/1994
(Continued)

OTHER PUBLICATIONS

International Search Report and Written Opinion dated Dec. 14, 2016 in International Patent Application Serial No. PCT/ZA2016/050031.
(Continued)

Primary Examiner — Jack W Lavinder
(74) Attorney, Agent, or Firm — Haugen Law Firm PLLP

(57) ABSTRACT

This invention relates to a protective buffer strap (10). More specifically, the invention relates to a protective buffer strap (10) capable of being strapped onto one or more articles (100, 200) to be closely restrained, thereby to prevent such articles (100, 200) from rubbing up against one another and causing damage, especially to surface finishes. The protective buffer strap (10) includes a strap (32) and an elongate body (12) from which the strap (32) extends, the elongate body (12) having a spine (26) and a plurality of projections (28) graduating lengths extending from the spine (26). The protective buffer strap (10) is configurable between an unwound condition and a wound condition. In the unwound condition, free ends (28A) of the projections (28) are spaced from one another along the spine (26). In the wound
(Continued)

condition, the elongate body (12) and/or strap (32) is deformed into a closed loop form with the free ends (28A) of the protections (28) jointly defining at least a portion of a bore (36) for receiving a first article (100) therein, which bore (36) is eccentric relative to the closed loop form. Furthermore, in the wound condition, the strap (32) extends about the closed loop form and/or the closed loop form and a second article (200) receivable between the strap (32) and the spine (26) thereby to retain the protective buffer in the wound condition such that in use, the distance between the first article(100) received within the bore (36) and the second article (200) is variable by rotating the closed loop form about the first article (100).

20 Claims, 6 Drawing Sheets

(51) Int. Cl.
    *F16B 1/00*     (2006.01)
    *F16B 2/08*     (2006.01)
    *F16F 1/376*     (2006.01)

(52) U.S. Cl.
    CPC ....... *F16B 2001/0028* (2013.01); *F16F 1/376* (2013.01)

(58) Field of Classification Search
    CPC .... F16B 2/08; F16B 1/00; F16B 1/376; F16B 7/04; F16F 2001/0028; B60R 9/048
    See application file for complete search history.

(56) References Cited

U.S. PATENT DOCUMENTS

| | | |
|---|---|---|
| 4,878,606 A | 11/1989 | Miller |
| 4,879,768 A | 11/1989 | McClees et al. |
| 5,161,824 A | 11/1992 | Li |
| 5,448,805 A | 9/1995 | Allen et al. |
| 5,590,826 A | 1/1997 | Endo |
| 5,628,440 A | 5/1997 | Gallazzini |
| 5,720,714 A | 2/1998 | Penrose |
| 5,775,555 A | 7/1998 | Bloemer |
| 5,829,656 A | 11/1998 | Reitz et al. |
| 6,318,609 B1 | 11/2001 | Swierz |
| 7,805,816 B1 | 10/2010 | Thorne, III et al. |
| 8,348,113 B2 | 1/2013 | Huang |
| 8,517,237 B1 | 8/2013 | Barber |
| 9,315,142 B1 | 4/2016 | Pedrini |
| 2004/0144816 A1 | 7/2004 | Ku |
| 2004/0185247 A1 | 9/2004 | Fenton et al. |
| 2005/0279798 A1 | 12/2005 | Nassanian |
| 2007/0245526 A1 | 10/2007 | Fidrych et al. |
| 2012/0217762 A1 | 8/2012 | Bruce et al. |
| 2013/0181022 A1 | 7/2013 | Bogoslofski et al. |
| 2014/0069975 A1 | 3/2014 | Flaherty |

FOREIGN PATENT DOCUMENTS

| | | | |
|---|---|---|---|
| GB | 1250057 | 10/1971 | |
| WO | WO-2013071346 A1 * | 5/2013 | ............... F16B 2/08 |
| WO | 2014125241 | 8/2014 | |

OTHER PUBLICATIONS

Roof Rack World, "Rhina RWP01 roof rack foam canoe pad", http://roofrack.com.au/products/water-sports-carriers/canoe-kayak-carriers/rhino-canoe-rwp01-foam-pads.html, last accessed May 21, 2015.

Dicks Sporting Goods, "Yakima Standard Foam Block Canoe Rack", http://www.dickssportinggoods.com/producVindex.jsp?productId=3997690, last accessed May 21, 2015.

Malone Auto Racks, "Foam Blocks & Kits", http://www.maloneautoracks.com/economic-foam-blocks-kayak-carrier-kits.php, last accessed May 21, 2015.

Protaper. "2.0 Square bar pads", http://www.protaper.com/products/handlebar-pads/2-0-square-bar-pads, last accessed May 21, 2015.

* cited by examiner

PROTECTIVE BUFFER STRAP

BACKGROUND OF THE INVENTION

THIS invention relates to a protective buffer strap. More specifically, the invention relates to a protective buffer capable of being strapped onto one or more articles to be closely restrained, thereby to prevent such articles from rubbing up against one another and causing damage, especially to surface finishes.

Although there may be many applications for the invention as described herein, it is envisaged that one of the main applications is the protection of bicycles carried in close proximity to each other on vehicle mounted carrier racks commonly used by cycling enthusiasts to transport their bicycles from one place to another.

Currently, it is general practice to simply wind a piece of soft fabric about a part of a first bicycle against which the other bicycle is likely to rub. The result is not entirely satisfactory, with the soft fabric often working loose from the first bicycle causing the two bicycles to come into contact and damage one another.

Attempts have been made to solve this problem using a buffer having a substantially cuboidal shape with an off-centre passage passing through it. A continuous communication slot extends along the length of the passage in order to enable the buffer to be transversely introduced onto a tubular frame member of the bicycle thereby locating such member in the passage.

Unfortunately, the shape of these buffers do not lend themselves well to providing a multitude of differing buffering thicknesses that would accommodate, for example, differently sized bicycles. Furthermore, independent straps are still required to tie the bicycles down. Often, the buffering thickness between the bicycles varies as they are tied down, requiring the buffer's orientation and position to be repeatedly adjusted, which can be a frustrating task.

Accordingly, it is an object of the present invention to provide a protective buffer strap that addresses the shortcomings of known prior art.

SUMMARY OF THE INVENTION

According to the invention there is provided a protective buffer strap including:
 a strap; and
 an elongate body from which the strap extends, the elongate body having:
  a spine; and
  a plurality of projections of graduating lengths extending from the spine such that:
   in an unwound condition, the free ends of the projections are spaced from one another along the spine; and
   in a wound condition, the elongate body and/or strap is deformed into a closed loop form with the free ends of the projections jointly defining at least a portion of a bore for receiving a first article therein, which bore is eccentric relative to the closed loop form;
  wherein the free ends of the projections are operably movable towards one another as the elongate body is deformed from the unwound condition into the wound condition; and
 and further wherein in the wound condition, the strap extends about the closed loop form and/or the closed loop form and a second article receivable between the strap and the spine thereby to retain the protective buffer in the wound condition;
such that in use, the distance between the first article received within the bore and the second article is variable by rotating the closed loop form about the first article.

Furthermore, the protective buffer may include a means of securing the strap in a wound state about the closed loop form thereby to secure the elongate body in the wound condition. The securing means may be a buckle, buttons, press studs to any other similar securing means, but typically hook and loop fastenings applied to opposing surfaces of the strap.

Typically, the elongate body in the unwound condition comprises longitudinally opposing first and second ends across which span: (i) opposing outer and inner contact surfaces; and (ii) opposing sides; and further wherein the outer contact surface is defined along the spine, with the inner contact surface being made up by the free ends of each of the projections which jointly define the eccentric bore in the wound condition of the elongate body.

In one embodiment of the invention, the projections may graduate in length from longest to shortest from one of the first or second longitudinal ends of the elongate body towards the other of the first or second longitudinal ends thereof.

In a second alternative embodiment of the invention, the projections may graduate in length from longest to shortest from each of the first and second longitudinal ends of the elongate body towards a midspan centre of the elongate body.

In a third preferred embodiment of the invention, the projections may graduate in length from longest to shortest from a midspan centre of the elongate body towards each of the first and second longitudinal ends thereof.

Generally, the elongate body in the unwound condition is symmetrical relative to a transverse plane passing through the midspan centre of the elongate body.

Typically, the elongate body in the unwound condition tapers from the midspan centre thereof towards each of the longitudinal first and second ends, and further wherein the strap extends from the first longitudinal end of the elongate body with a free end of the strap being operably receivable: (i) over the second longitudinal end of the elongate body; or (ii) through one or more strap receiving slots defined in the elongate body near the second longitudinal end thereof; thereby to retain the elongate body in the wound condition.

Preferably, the spine of the elongate body is substantially curved between the first and second longitudinal ends thereof.

Furthermore, the outer contact surface of the spine may be castellated defining a plurality of grooves in which the second article is locatable when operatively sandwiched between the spine and the strap.

Generally, the elongate body is biased towards either the wound condition or the unwound condition by its inherent resilience and/or a resilient member incorporated into the elongate body, preferably encased in the spine thereof.

Typically, and in the wound condition, the closed loop form of the elongate body and the eccentric bore defined therein are substantially cylindrical in shape with their respective central axes being substantially parallel and spaced relative to one another.

It is envisaged that at least the elongate body of the protective buffer strap may be made from many different materials, but preferably a polymer based, rubber based or silicon based material. Examples of some specific materials that may be used are EPDM (ethylene propylene diene terpolymer), SBR (styrene butadiene) and polyurethane.

BRIEF DESCRIPTION OF THE DRAWINGS

The invention will now be described in more detail, by way of example only, with reference to the accompanying drawings in which.

DETAILED DESCRIPTION OF THE DRAWINGS

Figure 1:
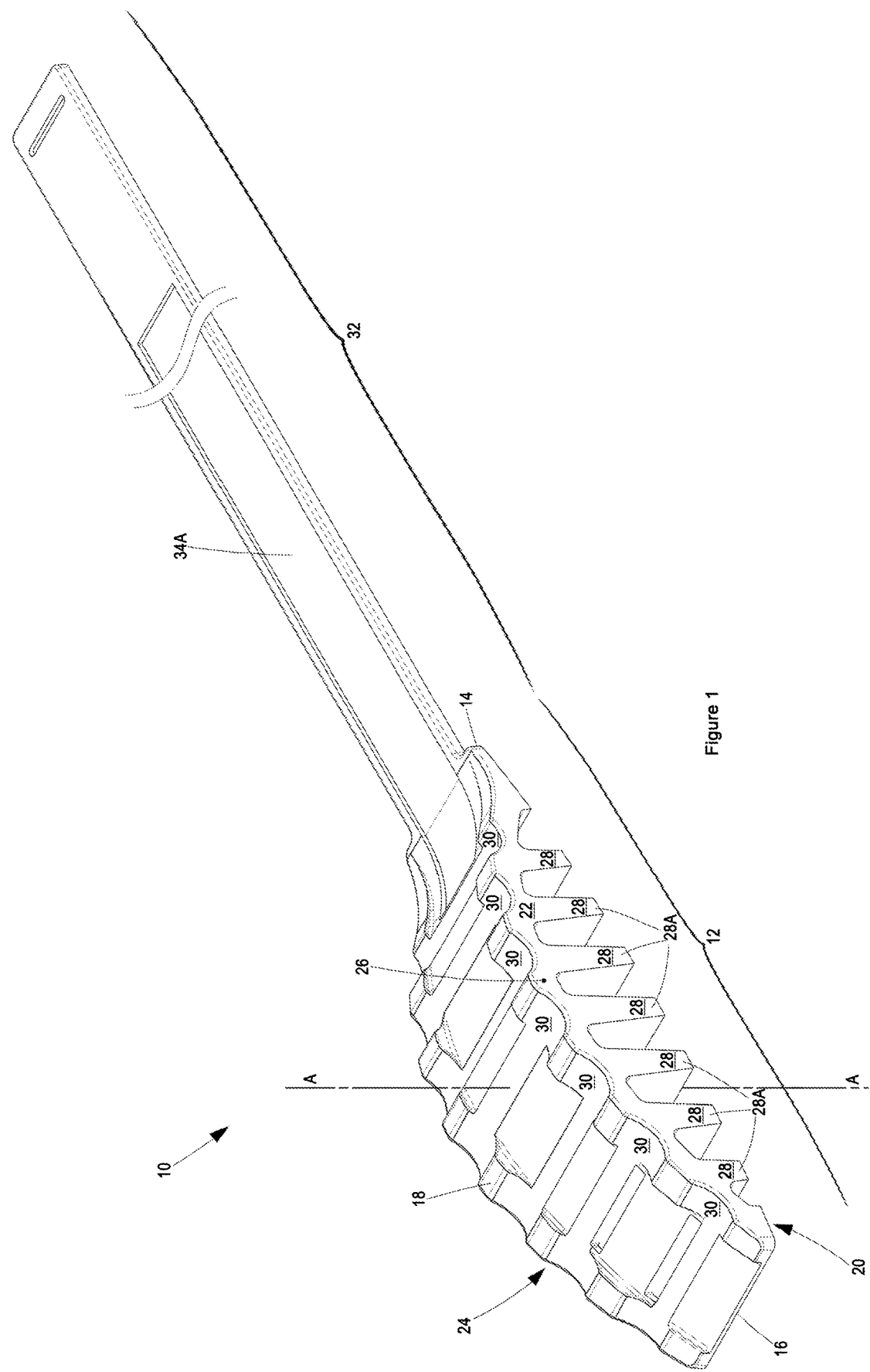
FIG. 1 is a first perspective view of a protective buffer strap in accordance with the present invention in an unwound condition.

A protective buffer strap according to a preferred embodiment of the invention is designated generally with reference numeral 10 in the accompanying figures. The protective buffer strap 10 comprises an elongate body 12 and a strap 32.

The elongate body 12 comprises opposing first and second longitudinal ends 14, 16 between which span opposing outer and inner contact surfaces 18, 20 and opposing sides 22, 24.

Figure 2:
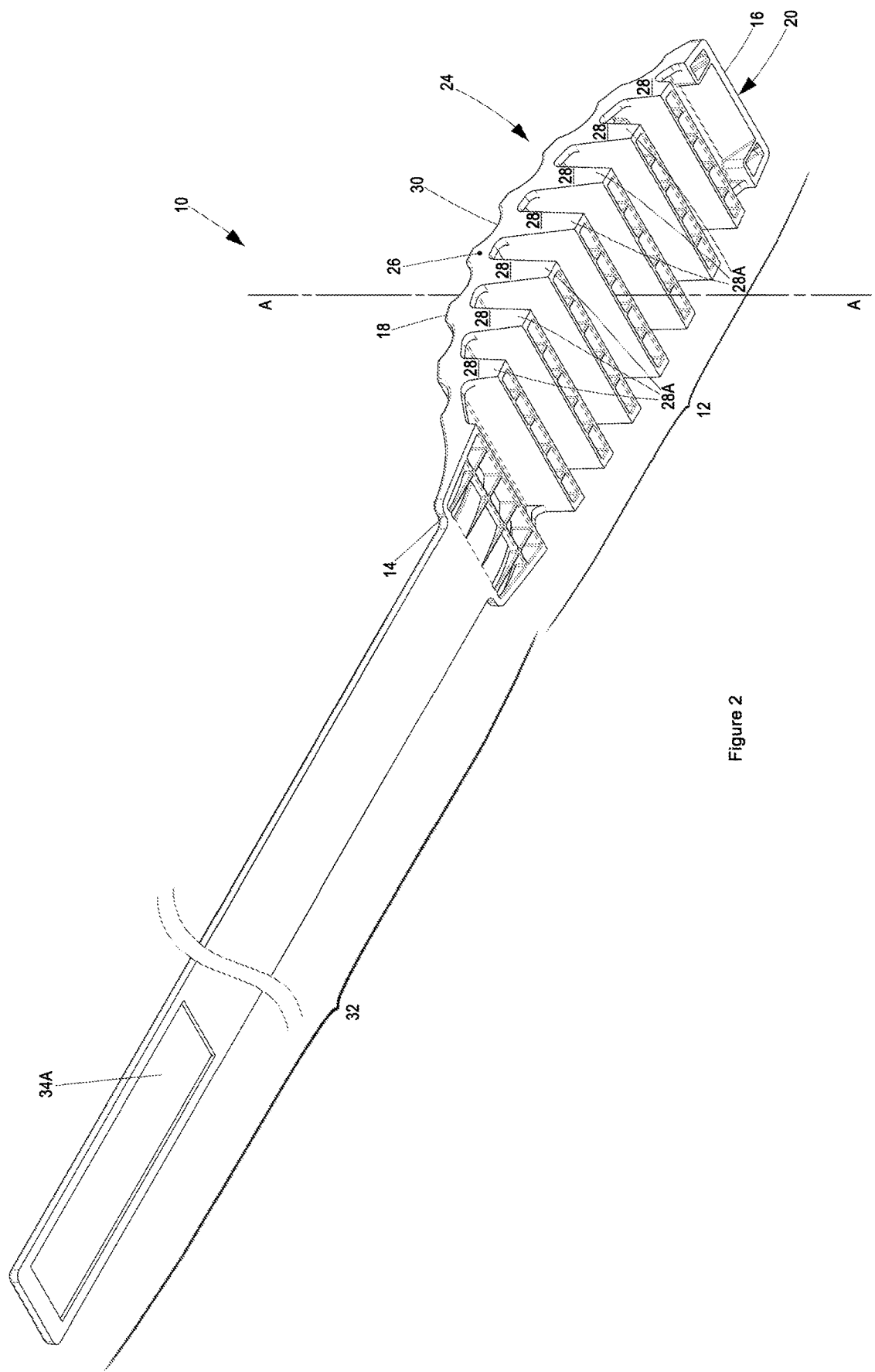
FIG. 2 is a second perspective view of the protective buffer strap of FIG. 1.

Furthermore, the elongate body 12 is made up of a spine 26 spanning between the first and second longitudinal ends 14, 16 of the elongate body 12 having a plurality of projections 28 extending therefrom such that free ends 28A of the projections 28 are spaced from one another along the length of the spine 26 as illustrated in an unwound condition in FIGS. 1 and 2.

Although the elongate body 12, and particularly the spine 26 and projections 28 thereof may be configured in many difference ways, in the preferred embodiment the projections 28 graduate in length from longest to shortest from a midspan centre A-A of the elongate body 12 towards each of the longitudinal first and second ends.

Preferably, the elongate body 12 is symmetrical about a transverse plane passing through the midspan centre A-A such that the elongate body 12 tapers from such centre towards the first and second longitudinal ends 14, 16 with the spine 26 taking a substantially curved shape.

The outer contact surface 18 of the spine 26 is castellated so as to define a plurality of grooves 30 there along in which tubular articles are operatively locatable. The strap 32, also elongate in dimension, extends from the first longitudinal end 14 of the elongate body 12 and includes thereon securing means in the form of hook and loop fastenings 34A, 34B.

Figure 3:
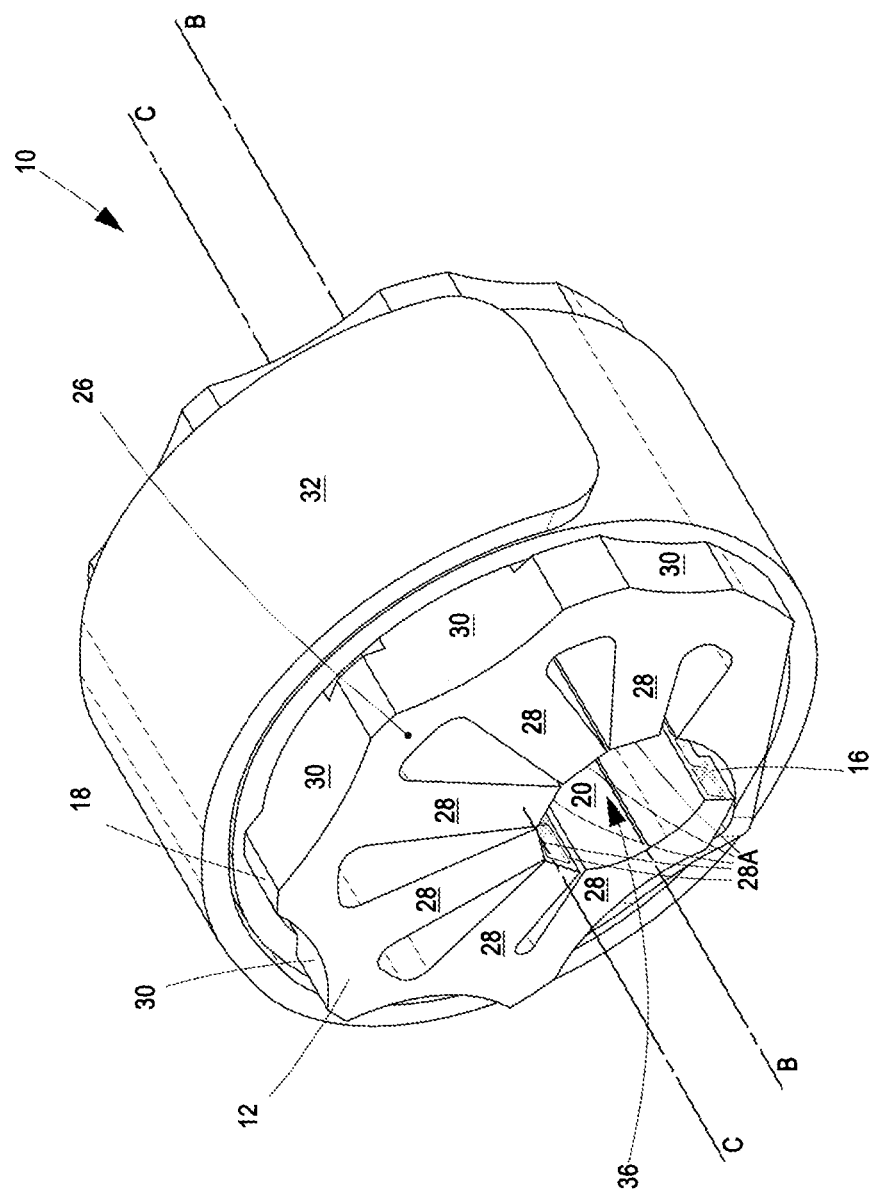
FIG. 3 is a perspective view of the protective buffer strap of FIG. 1 in a wound condition.

In a wound condition of the elongate body 12 as illustrated in FIG. 3, the elongate body 12 is wound into a closed loop form with the free ends 28A of the projections 28, and the inner contact surfaces 20 thereof, moving towards each other and into contact or close proximity thereby jointly to define a bore 36 for receiving a tubular article therein.

It will be appreciated that the graduating lengths of the projections 28 cause the bore 36 to be defined in the closed loop form of the elongate body 12 eccentrically relative to the closed loop form, such that the central axis B-B of the eccentric bore 36 is substantially parallel and spaced from the central axis C-C of the elongate body 12 in its closed loop form.

Figure 4:
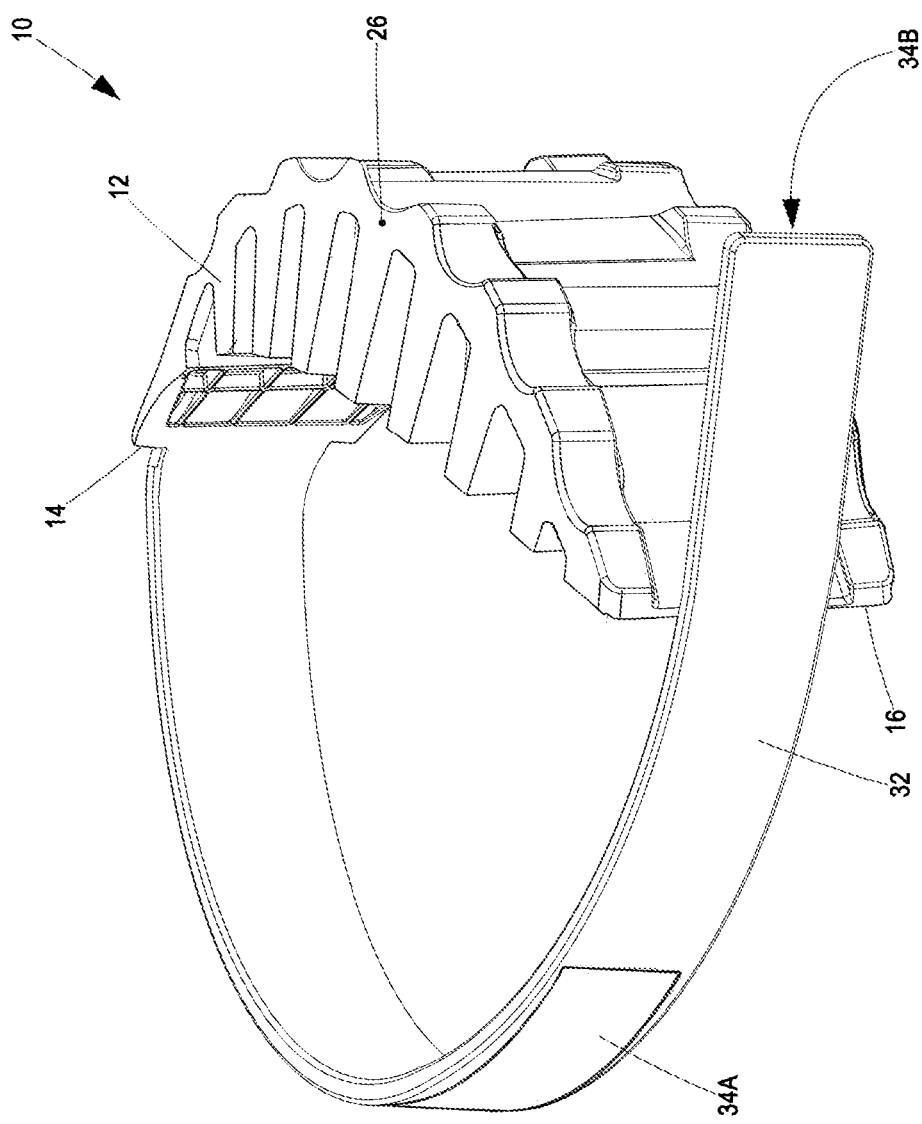
FIG. 4 is a first perspective view of the protective buffer strap of FIG. 1 being deformed from the unwound condition towards the wound condition.
Figure 5:
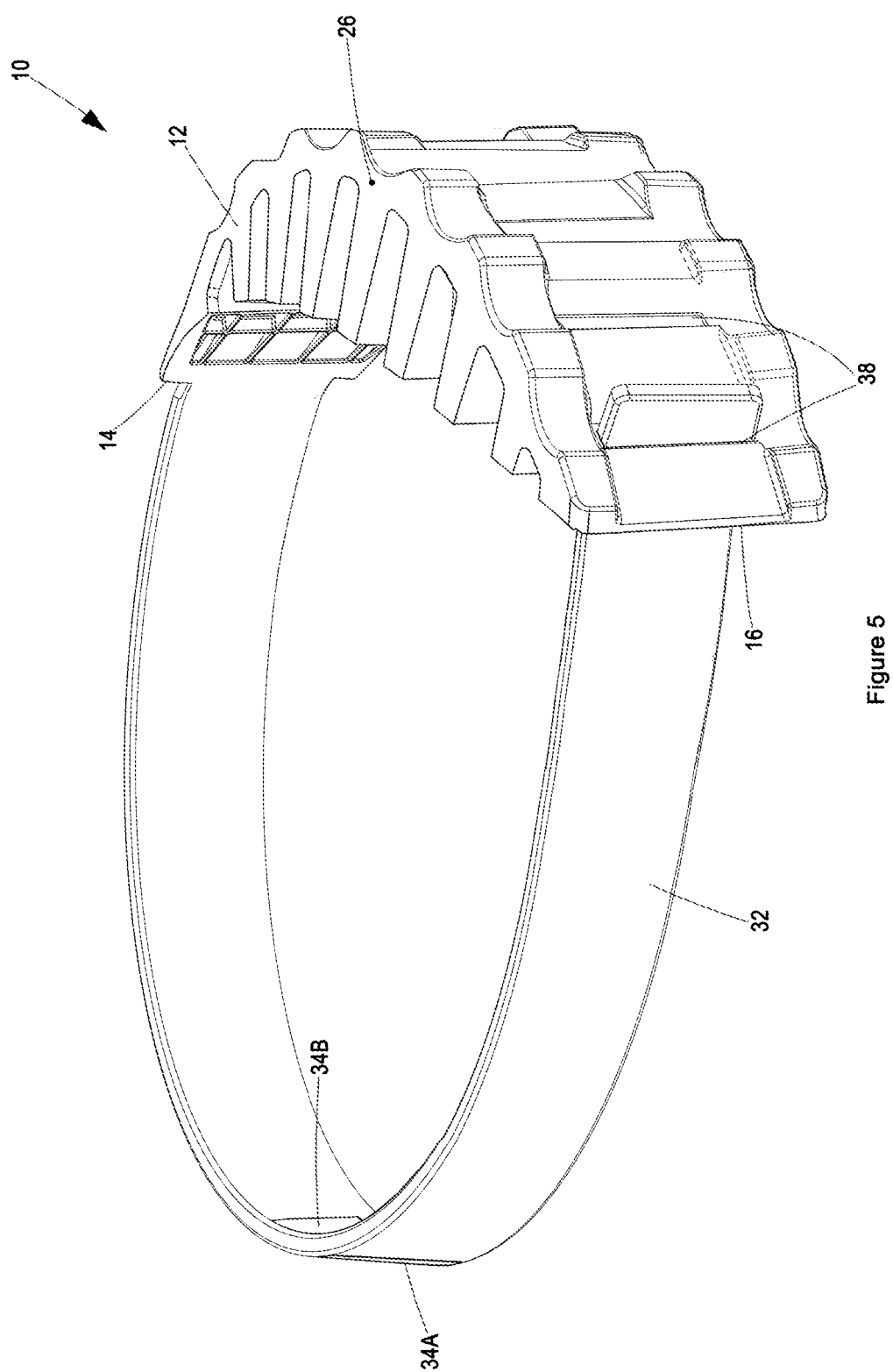
FIG. 5 is a second perspective view of the protective buffer strap of FIG. 1 being deformed from the unwound condition towards the wound condition.

FIGS. 4 and 5 illustrate how the elongate body 12 may be deformed from the unwound condition into the wound condition. With reference to FIG. 4, the elongate body 12 may be deformed by bending or winding on itself with the strap 32 passing over the second longitudinal end 16 of the elongate body 12.

With reference to FIG. 5, the elongate body 12 may be deformed by bending or winding on itself with the strap 32 passing through one or more strap receiving slots 38 defined in the elongate body 12 near the second longitudinal end 16 thereof.

Whether the strap 32 passes over the second longitudinal end 16 or through one of the strap receiving slots 38, it will be appreciated that it may be wound about the closed loop form of the elongate body 12 in the wound condition thereby to retain the elongate body 12 in such a condition as illustrated in FIG. 3.

Once wound about the closed loop form of the elongate body 12, the securing means 34A, 34B come into engagement with one another thereby to secure the elongate body 12 in the wound condition.

Figure 6:
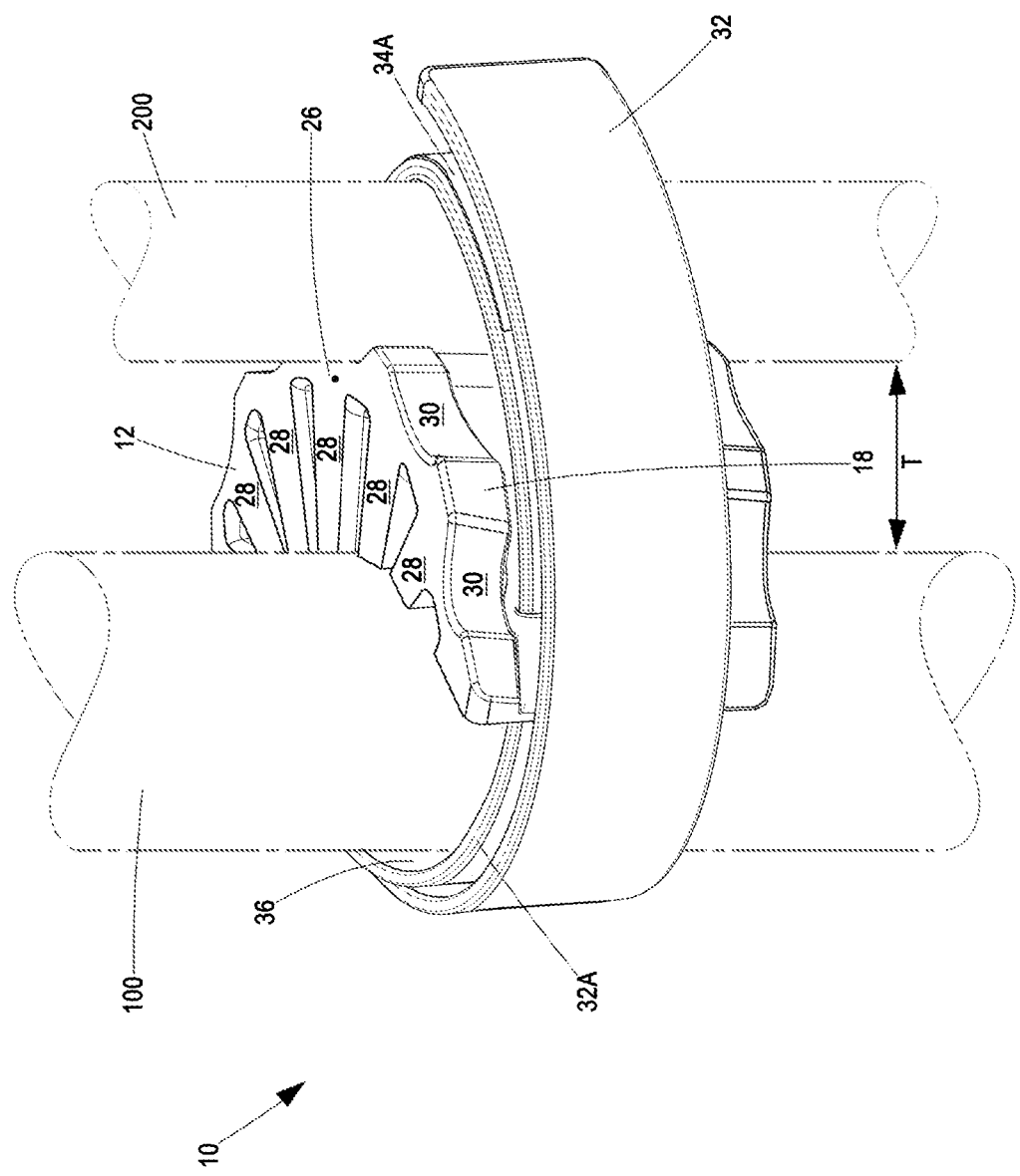
FIG. 6 is a third perspective view of the protective buffer strap of FIG. 1 in the wound condition and wound about a pair of tubular articles.

With reference now to FIG. 6, the protective buffer 10 is illustrated in the wound condition with the deformed elongate body 12 and an inner most winding 32A of the strap 32 jointly defining the closed loop form and the eccentric bore 36 in which a first tubular article 100 is received. The strap 32 then continues to wind about the elongate body 12 thereby to sandwich a second tubular article 200 between itself and the outer contact surface 18 of the elongate body 12.

It will be appreciated that by rotating the closed loop form of the elongate body 12 about the first tubular article 100, the buffer thickness "T" between the first and second tubular articles 100, 200 is adjustable. Once the required thickness T is attained, the second tubular article 200 is located within one of the grooves 30 defined on the outer contact surface 18 of the elongate body 12, with the strap 32 acting to retain the second tubular article 200 in register with the relevant groove 30.

The elongate body 12 may be made from a material that is resiliently deformable and thereby inherently biased to the unwound or wound condition. In an alternative embodiment, the spine 26 may encase a resilient member that biases the elongate body 12 to one of the condition. Preferably, the elongate body 12 is biased towards the unwound condition.

Although the invention has been described above with reference to preferred embodiments, it will be appreciated that many modifications or variations of the invention are possible without departing from the spirit or scope of the invention.

The invention claimed is:

1. A protective buffer strap including:
    a strap; and
    an elongate body from which the strap extends, the elongate body having a spine and a plurality of projections extending from the spine;
    characterized in that:
        the projections graduate in length, at least partially over a span of the elongate body as defined between opposing first and second longitudinal ends thereof, the elongate body being deformable between:

an unwound condition, wherein free ends of the projections are spaced from one another along the spine; and a wound condition, wherein at least one of the elongate body and the strap assume a closed loop form with the free ends of the projections moved into closer relative proximity with one another than in the unwound condition jointly to define at least a portion of a bore for receiving a first article therein, which bore is eccentric relative to the closed loop form; and wherein the strap is elongate having a dimension sufficient to extend about the closed loop form to retain the protective buffer strap in the wound condition thereby to in use enable securement of the protective buffer strap on the first article, or on the first article and a second article captured between the spine of the elongate body and the strap, such that the first and second articles are spaced by a distance coinciding with the length of the one or more projections located between the first and second articles, with such distance being variable by rotating the closed loop form about the first article to locate projections having another length therebetween.

2. A protective buffer strap according to claim 1 further including a means of securing the strap in a wound state about the closed loop form thereby to secure the elongate body in the wound condition.

3. A protective buffer strap according to claim 2, wherein the elongate body in the unwound condition further comprises: (i) opposing outer and inner contact surfaces; and (ii) opposing sides; the outer contact surface being defined along the spine, with the inner contact surface being made up by the free ends of each of the projections which jointly define the eccentric bore in the wound condition of the elongate body.

4. A protective buffer strap according to claim 3, wherein the projections graduate in length from shortest to longest from one of the first or second longitudinal ends of the elongate body towards the other of the first or second longitudinal ends thereof.

5. A protective buffer strap according to claim 3, wherein the projections graduate in length from shortest to longest from each of the first and second longitudinal ends of the elongate body towards a midspan centre of the elongate body.

6. A protective buffer strap according to claim 5, wherein the elongate body in the unwound condition is symmetrical relative to a transverse plane passing through the midspan centre of the elongate body.

7. A protective buffer strap according to claim 6, wherein the elongate body in the unwound condition tapers from the midspan centre thereof towards each of the first and second longitudinal ends, and further wherein the strap extends from the first longitudinal end of the elongate body with a free end of the strap being operably receivable: (i) over the second longitudinal end of the elongate body; or (ii) through one or more strap receiving slots defined in the elongate body near the second longitudinal end thereof thereby to retain the elongate body in the wound condition.

8. A protective buffer strap according to claim 7, wherein the spine of the elongate body is substantially curved between the first and second longitudinal ends thereof.

9. A protective buffer strap according to claim 8, wherein the outer contact surface of the spine is castellated defining a plurality of grooves in which the second article is locatable when operatively sandwiched between the spine and the strap.

10. A protective buffer strap according to claim 9, wherein the elongate body is biased towards either the wound condition or the unwound condition by its inherent resilience, a resilient member incorporated into the elongate body, or both.

11. A protective buffer strap according to claim 10, wherein the securing means is hook and loop fastenings applied in opposing surfaces of the strap.

12. A protective buffer strap according to claim 11, wherein in the wound condition, the closed loop form of the elongate body and the eccentric bore defined therein are substantially cylindrical in shape with their respective central axes being substantially parallel and spaced relative to one another.

13. A protective buffer strap according to claim 3, wherein the projections graduate in length from longest to shortest from a midspan centre of the elongate body towards each of the first and second longitudinal ends thereof.

14. A protective buffer strap according to claim 13, wherein the elongate body in the unwound condition is symmetrical relative to a transverse plane passing through the midspan centre of the elongate body.

15. A protective buffer strap according to claim 14, wherein the elongate body in the unwound condition tapers from the midspan centre thereof towards each of the first and second longitudinal ends, and further wherein the strap extends from the first longitudinal end of the elongate body with a free end of the strap being operably receivable: (i) over the second longitudinal end of the elongate body; or (ii) through one or more strap receiving slots defined in the elongate body near the second longitudinal end thereof; thereby to retain the elongate body in the wound condition.

16. A protective buffer strap according to claim 15, wherein the spine of the elongate body is substantially curved between the first and second ends thereof.

17. A protective buffer strap according to claim 16, wherein the outer contact surface of the spine is castellated defining a plurality of grooves in which the second article is locatable when operatively sandwiched between the spine and the strap.

18. A protective buffer strap according to claim 17, wherein the elongate body is biased towards either the wound condition or the unwound condition by its inherent resilience, a resilient member incorporated into the elongate body, or both.

19. A protective buffer strap according to claim 18, wherein the securing means is hook and loop fastenings applied in opposing surfaces of the strap.

20. A protective buffer strap according to claim 19, wherein in the wound condition, the closed loop form of the elongate body and the eccentric bore defined therein are substantially cylindrical in shape with their respective central axes being substantially parallel and spaced relative to one another.

* * * * *